(12) United States Patent  
Plettner

(10) Patent No.: US 9,053,833 B2  
(45) Date of Patent: Jun. 9, 2015

(54) DC HIGH-VOLTAGE SUPER-RADIANT FREE-ELECTRON BASED EUV SOURCE

(71) Applicant: Tomas Plettner, San Ramon, CA (US)

(72) Inventor: Tomas Plettner, San Ramon, CA (US)

(73) Assignee: KLA-Tencor Technologies, Corporation, Milpitas, CA (US)

( * ) Notice: Subject to any disclaimer, the term of this patent is extended or adjusted under 35 U.S.C. 154(b) by 162 days.

(21) Appl. No.: 13/779,331

(22) Filed: Feb. 27, 2013

(65) Prior Publication Data

US 2014/0239805 A1   Aug. 28, 2014

(51) Int. Cl.
*H01J 29/98* (2006.01)
*G21K 5/04* (2006.01)

(52) U.S. Cl.
CPC .................................. *G21K 5/04* (2013.01)

(58) Field of Classification Search
CPC ........................................................ G21K 5/04
USPC ............................................................ 315/9
See application file for complete search history.

(56) References Cited

U.S. PATENT DOCUMENTS

| 7,755,068 | B2 * | 7/2010 | Ma et al. ................. 250/492.3 |
| 7,994,472 | B2 * | 8/2011 | Plettner et al. ............... 250/251 |
| 8,471,226 | B2 | 6/2013 | Komori et al. |
| 8,536,551 | B2 * | 9/2013 | Moriya et al. ............. 250/504 R |
| 2004/0101008 | A1 | 5/2004 | Kurtz et al. |
| 2004/0238762 | A1 | 12/2004 | Mizoguchi et al. |
| 2007/0273957 | A1 | 11/2007 | Zalevsky et al. |
| 2013/0088697 | A1 * | 4/2013 | Labetski et al. ................ 355/67 |
| 2013/0099132 | A1 * | 4/2013 | Ehm et al. .................. 250/396 R |
| 2013/0271827 | A1 * | 10/2013 | Delgado et al. ................ 359/361 |
| 2013/0320232 | A1 * | 12/2013 | Hori et al. ................. 250/432 R |

FOREIGN PATENT DOCUMENTS

| JP | 2007258069 A | 10/2007 |
| JP | 2010080940 A | 4/2010 |

OTHER PUBLICATIONS

Triveni Rao "Free electron laser and Inverse Free electron laser" USPAS 2008 Annapolis.*
Goldstein et al FEL applications in EUV lithography proceedings of 27th IFEL conference 2005.*
Graves et al "Intense Superradiant Xrays from a compact source . . . " PRL 108. 263904 (2012).*

(Continued)

*Primary Examiner* — Douglas W Owens
*Assistant Examiner* — Srinivas Sathiraju
(74) *Attorney, Agent, or Firm* — Joshua D. Isenberg; JDI Patent

(57) ABSTRACT

An array of spatially separated beamlets is produced by a corresponding array of charged particle emitters. Each emitter is at an electrostatic potential difference with respect to an immediately adjacent emitter in the array. The beamlets are converged laterally to form an charged particle beam. The beam is modulated longitudinally with infrared radiation to form a modulated beam. The charged particles in the modulated beam are bunched longitudinally to form a bunched beam. The bunched beam may be modulated with an undulator to generate a coherent radiation output. This abstract is provided to comply with rules requiring an abstract that will allow a searcher or other reader to quickly ascertain the subject matter of the technical disclosure. It is submitted with the understanding that it will not be used to interpret or limit the scope or meaning of the claims.

20 Claims, 3 Drawing Sheets

(56) References Cited

OTHER PUBLICATIONS

J. Arthur, K. Bane et al. "Linac Coherent Light Source ( LCLS) Design Study Report", originally published Apr. 1998. Prepared by Stanford Linear Accelerator Center, Stanford University.

Jere Harrison et al. "Surface-micromachined magnetic undulator with period length between 10 βm and 1 mm for advanced light sources", published Jul. 31, 2012. Physical Review Special Topics—Accelerators and Beams 15, 070703 (2012).

International Search Report and Written Opinion for International Application No. PCT/US2014/019140, mailed Jun. 24, 2014.

* cited by examiner

DC HIGH-VOLTAGE SUPER-RADIANT FREE-ELECTRON BASED EUV SOURCE

FIELD OF THE INVENTION

Embodiments of the present invention relate to EUV radiation generation, and more particularly, to an apparatus and a method for generating a EUV radiation source.

BACKGROUND OF THE INVENTION

Semiconductor integrated circuits are typically manufactured using a lithographic process. Lithography may involve, e.g., coating a semiconductor wafer with a photosensitive resist, projecting light through a patterned mask onto the resist, and developing the exposed resist. The wavelength of light used in the lithography process is a key factor in the drive for higher levels of microcircuit integration. Since the minimum processing dimension of lithography depends on the wavelength of light used, it is necessary to shorten the wavelength of the irradiated light in order to improve the integration degree of the integrated circuit. In recent years, extreme ultraviolet (EUV) radiation which radiates extreme ultraviolet radiation with wavelengths from 13 nm to 14 nm, has been developed as semiconductor lithography light source to meet the demands for micro-miniaturization of semiconductor device.

There are a number of methods of generating EUV radiation. In one example, EUV radiation may be generated through plasma in which high temperature plasma is first created by heating and excitation of an extreme ultraviolet radiating species and then the EUV radiation radiated from the plasma is extracted. However, both higher-harmonic generation as well as thermally produced plasma processes require very high peak power. In addition, the laser produced plasma EUV light source has a relatively low repetition rate.

Another method of generating EUV radiation is free electron laser (FEL). A FEL involves interaction between a high brightness electron beam and an intense light beam while traveling through a periodic magnetic field to generate coherent electromagnetic radiation. Specifically, an electron beam is first accelerated to almost the speed of light with very high kinetic energies from about 100 MeV to 1 GeV. The accelerated beam in turn passes through a FEL oscillator, a periodic transverse magnetic field produced by an array of magnets with alternating poles within an optical cavity along the beam path. The acceleration of the electrons along this path results in the release of photons, which, with appropriate optical system, may emit a coherent light beam of extremely high power. The optical system typically includes a ring resonator having multiple mirrors. While these have proven effective for wavelengths ranging from the far IR to the UV, it becomes difficult to implement FEL for EUV generation because the reflectivity of metals and other mirror coatings drops significantly at shorter wavelengths and thus lack of good reflecting surfaces to form the mirrors.

Another FEL method involves a process of self-amplified spontaneous emission (SASE). These FELs do not use resonator mirrors and may operate at short wavelengths on a single pass of a high brightness electron through a long undulator. In particular, all electrons are initially distributed randomly and emit their incoherent spontaneous radiation. Through the interaction of their radiation and oscillations of electrons, they drift into microbunches separated by a distance equal to one radiation wavelength. Through this interaction, all electrons begin emitting coherent radiation in phase. However, SASE requires a very bright electron beam (i.e., high peak current, low emittance and small energy spread) and a comparatively long undulator to build up beam intensity from spontaneous noise to a saturated intensity.

It is within this context that aspects of the present disclosure arise.

SUMMARY

According to aspects of the present disclosure, a system comprises an accelerator unit including an array of spatially separated charged particle emitters, an optical-frequency modulator and an undulator. Each emitter in the array has an electrostatic potential difference with respect to an immediately adjacent emitter in the array produces a charged particle beamlet. The beamlets are converged as one spatially overlapped energy-modulated charged particle beam at the output of the accelerator unit. The optical-frequency modulator modulates the beamlets from the accelerator unit with an infrared radiator. Charged particles in the modulated beamlets are, in turn, bunched together to form a bunched energy-modulated charged particle beam.

If the charged particle emitters may be electron emitters, each charged particle beamlet is an electron beamlet, and the charged particle beam is an electron beam. In some implementations the electron emitters may be DC electron guns. In some implementations the optical frequency modulator may include a laser. In certain of these implementations (but not all), the laser may be a Nd:YAG laser.

An undulator or other free-electron radiation device may be located at a point of optimum bunching of the modulated electron beam to generate a coherent radiation output from modulation of the bunched energy-modulated electron beam. Because the beam entering the undulator is already bunched, the bulk of the electrons suffer an energy loss from radiating.

In some implementations, the array of emitters may be placed at a mid-plane of a half-chicane to spatially overlap the array of beamlets at an exit of the chicane.

In some implementations, the electric potential difference between the emitters in the array may be adjustable.

In some implementations, one or more of the emitters in the array are configured to be selectively switched on or off.

In some implementations bunch compressor may be located along a beam propagation pathway between the optical frequency modulator and the undulator to compensate for lateral charged particle dispersion.

In some implementations each of the beamlets may be accelerated to about 100 KeV from the respective emitter in the array.

In some implementations an output beam from the undulator may be collected at a potential slightly below that of the potential used to accelerate the beamlets.

In some implementations the accelerator unit may include a half chicane having two bending magnets configured to bend the beamlets from the emitters in the array so as to laterally converge the beamlets to form the charged particle beam output from the accelerator unit.

In some implementations, the optical-frequency modulator may be an inverse free electron laser. Should the transverse emittance of the beam be sufficiently small, some implementations may allow for the use of an inverse-transition radiation accelerator, inverse-Cerenkov accelerator or a laser-driven photonic accelerator structure as a means to modulate the energy of the beamlets.

In some implementations the emitter array, half-chicane and the modulator may serve as an injector of a bunched particle beam for laser-driven particle accelerators.

According to certain aspects of the disclosure a method of generating EUV radiation may involve emitting an array of spatially separated beamlets. Each beamlet is produced by a corresponding array of electron emitters. Each electron emitter is at an electrostatic potential difference with respect to an immediately adjacent emitter in the array, whereby the array of electron emitters produces a corresponding array of electron beamlets having different energies. The electron beamlets are converged laterally to form an electron beam. The beamlets in the electron beam are modulated longitudinally with infrared radiation to form a modulated beam. The electrons in the modulated beam are bunched longitudinally to form a bunched beam. The bunched beam interacts with an undulator to generate a coherent radiation output.

In some implementations of the method the bunched beam may be compressed laterally to correct electron dispersion or to focus the beam. In some implementations the wavelength of the coherent output radiation may be adjusted by adjusting the electrostatic potential difference between adjacent emitters in the array. In some implementations, a pulse period of the coherent output radiation may be adjusted by selectively switching one or more of the electron emitters on or off so as to adjust a number of beamlets emitted.

According to certain aspects of the disclosure a method of generating a bunched particle beam may involve emitting an array of spatially separated beamlets. Each beamlet is produced by a corresponding array of charged particle emitters. Each emitter is at an electrostatic potential difference with respect to an immediately adjacent emitter in the array. As a result, the array of emitters produces a corresponding array of charged particle beamlets having different energies. The beamlets are converged laterally to form an energy modulated direct current charged particle beam. The beamlets in the charged particle beam are modulated longitudinally with infrared radiation to form a modulated beam. The charged particles in the modulated beam are bunched longitudinally to form a bunched energy-modulated charged particle beam.

BRIEF DESCRIPTION OF THE DRAWINGS

Objects and advantages of the invention will become apparent upon reading the following detailed description and upon reference to the accompanying drawings in which.

DETAILED DESCRIPTION

In the following Detailed Description, reference is made to the accompanying drawings, which form a part hereof, and in which is shown by way of illustration specific embodiments in which the invention may be practiced. The drawings show illustrations in accordance with examples of embodiments, which are also referred to herein as "examples". The drawings are described in enough detail to enable those skilled in the art to practice the present subject matter. The embodiments can be combined, other embodiments can be utilized, or structural, logical, and electrical changes can be made without departing from the scope of what is claimed. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated. The following detailed description, therefore, is not to be taken in a limiting sense, and the scope of the present invention is defined by the appended claims.

As used herein, the term "light" generally refers to electromagnetic radiation characterized by a frequency somewhere in a range of frequencies running from the infrared through the ultraviolet, roughly corresponding to a range of vacuum wavelengths from about 1 nanometer ($10^{-9}$ meters) to about 100 microns.

As used herein, the term extreme ultraviolet (EUV) generally refers high-energy electromagnetic radiation, in the part of the electromagnetic spectrum spanning vacuum wavelengths from about 124 nm down to about 10 nm, and therefore (by the Planck-Einstein equation) having photons with energies from about 10 electron volts (eV) up to 124 eV (corresponding to 124 nanometers (nm) to 10 nm respectively).

Aspects of the present disclosure include electrostatic particle accelerator units for EUV free-electron sources instead of RF or plasma wakefield accelerators. This application may eliminate the need for an RF pulsed time structure as well as the need for high-power klystrons and corresponding pulsed power supplies. Additionally, with respect to plasma wakefield accelerators, the present invention may eliminate the need of tera-watt or petta-watt pulsed lasers that also have to run at low repetition rates.

Figure 1:
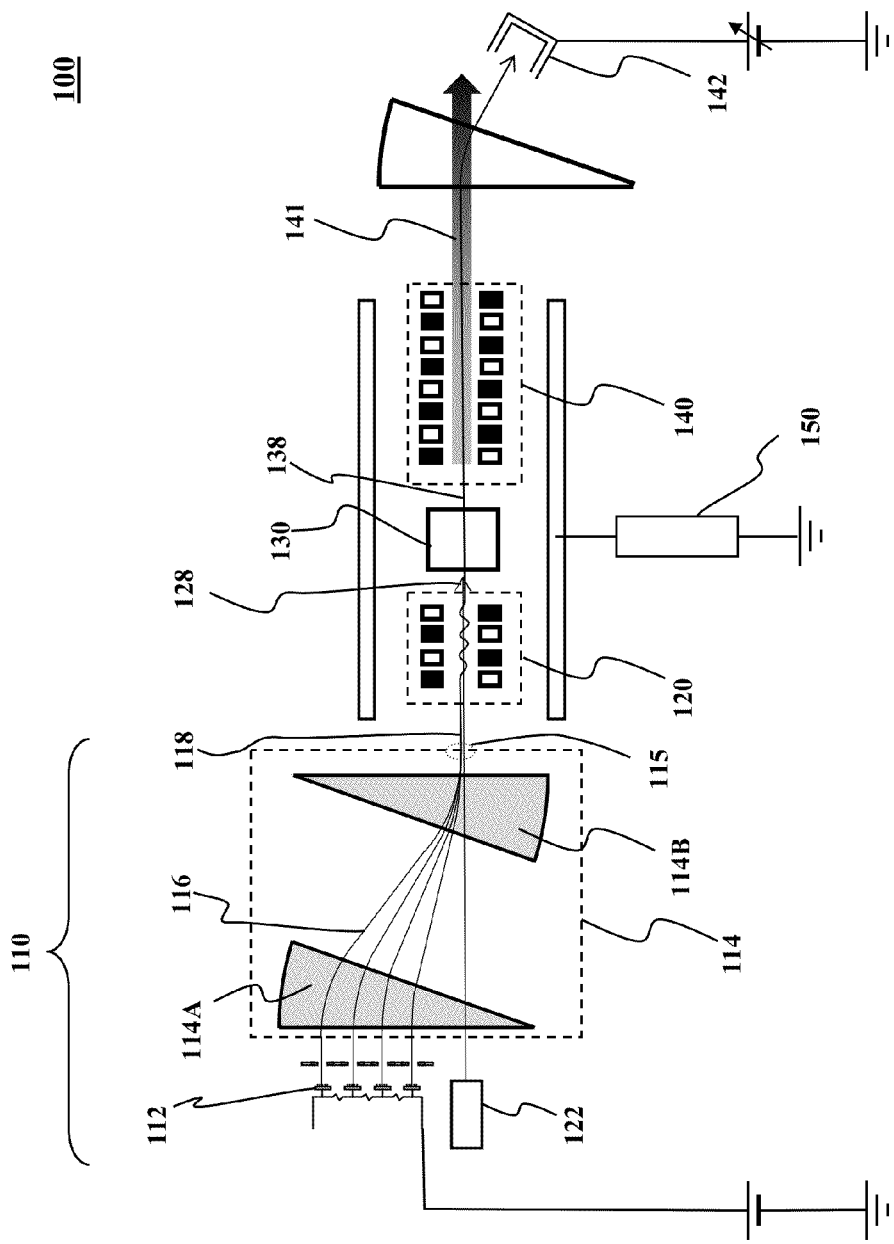
FIG. 1 is a diagram of a system for EUV radiation generation according to an aspect of the present disclosure.

FIG. 1 is a diagram of a system for generation of EUV radiation according to an aspect of the present disclosure. The EUV radiation generation system 100 includes an accelerator unit 110, an optical frequency modulator 120, a bunch compressor 130, and an undulator 140.

The accelerator unit 110 may include an array of electron emitters 112 and a half magnetic chicane 114. Specifically, a linear array of electrostatic electron emitters 112 may be located at the dispersive plane (i.e., the mid-plane) of the half-chicane 114. By placing the array of emitters 112 at the mid-plane of the half-chicane the array of electron beamlets 116 of different energy from the emitters overlap at an exit 115 of the half-chicane 114.

By way of example and not by way of limitation the half-chicane 114 may include first and second bending magnets 114A, 114B configured to bend the electron beamlets 116 in opposite senses by approximately equal amounts. The electron emitters 112 are arranged proximate an energy dispersive plane of the half-chicane 114 such that higher energy beamlets from emitters at higher potential are bent less than lower energy beamlets from emitters at lower potential. The different amounts of bending of the beamlets of different energies by the magnets 114A, 114B results in the beamlets 116 converging laterally as they exit the half-chicane 114.

In one example, the electron emitters may be direct current (DC) electron guns. Also, the electron emitters may be laser-driven photocathodes. The emitters in the array are placed with the same spatial distance in the dispersive plane from each other. Also each emitter has an electrostatic potential difference to the immediately adjacent emitter in the array.

For example, the first emitter in the array is in few volts different from the second emitter and the second emitter is in same few volts different from the third. Such arrangement of the electron emitters forms a chirped electron source. A control circuit may be provided and configured to adjust or change the voltage difference between the emitters.

Each emitter in the array produces a beamlet 116. The kinetic energy of the beamlets has to be high enough, and as an example, the beamlets emitted by the DC gun array are accelerated to about 100 KeV. In addition, each of the electron emitters may be selectively switched on or off. Particularly, a control system may be optionally provided to control the on/off function of each emitter such that the number of the electron emitted turned on is adjustable.

The chicane 114 may include two dipole magnets to bend the path of the accelerated electrons as they travel in a magnetic field change direction. In the chicane 114, the electrons with lower energy take longer flight paths and are delayed in comparison to electrons with higher energy. By appropriate adjustment on the displacement and energy difference between the emitters in the array, all the electron beamlets may be converged as one energy-modulated direct current (DC) electron beam 118 at the exit of the chicane 114.

Figure 2A:
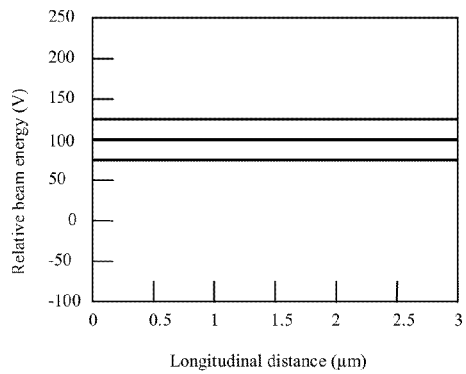
FIGS. 2A-2F illustrate evolution of an electron beam from a system for EUV radiation generation according to an aspect of the present disclosure.
Figure 2B:
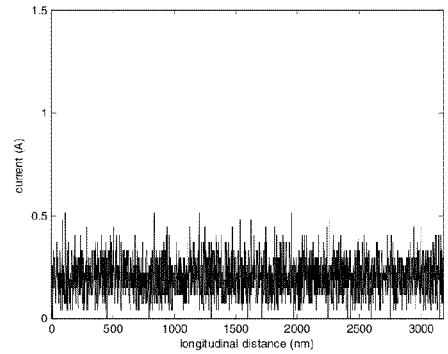

FIG. 2A show relative beam energy of the illustrative continuous electron beamlets, each beamlet separated by few volts. FIG. 2B show currents of the illustrative electron beam 118 at the exit of the accelerator unit 110.

The energy-modulated DC electron beam 118 from the accelerator unit 110 enters an optical-frequency modulator 120 for energy modulation. In one example, the modulator 120 is an inverse free electron laser (IFEL). The optical-frequency modulator 120 may include an infrared radiation generator 122 producing infrared radiation. In one example, the infrared radiation generator 122 is a neodymium-doped yttrium aluminum garnet (Nd:YAG) laser. Nd:YAG lasers typically emit light with a wavelength of 1064 nm in the infrared.

In the IFEL, the electron beam 118 moves through an undulator magnet. The infrared radiation sent through the electron beamlets also propagates inside the magnet. The alternating magnet provides a magnetic field such that the electron beam 118 is forced to wiggle in a direction transverse to the direction of propagation. The transverse motion of the electrons can be coupled with the transverse motion of the electric field of the infrared radiator. This coupling causes energy exchange between the infrared radiation and the electrons. As such, a modulated beam 128 is generated and output from the optical frequency modulator 120. The frequency modulator 120, buncher 130 and undulator 140 can all be floated to an arbitrary electrostatic potential with 150 so as to control the kinetic energy of the beam in that section.

Figure 2C:
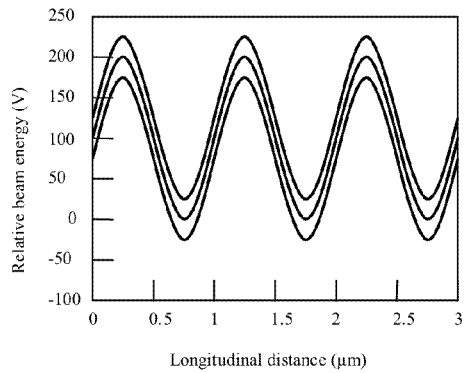
Figure 2D:
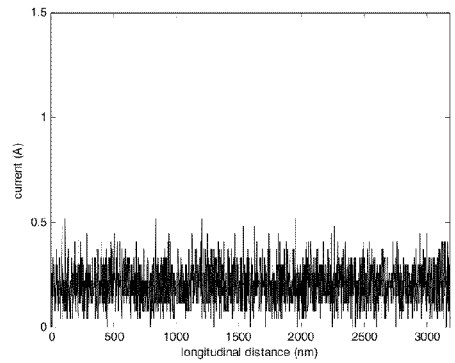

FIG. 2C shows the relative beam energy of an illustrative modulated beam 128 after modulation by an IFEL. FIG. 2D shows the currents of the illustrative modulated beam 128.

After the energy modulation, the modulated electrons are left to propagate in a drift space where fast electrons catch up with the slower ones. This causes electrons to bunch at the frequency of the infrared radiator and results in the density modulation of the beamlets with the electron bunches representing RF current. Specifically, the fast electrons in a first beamlet in the array overtake the slower ones in the same beamlet to form a first electron bunch. The fast electrons in a second beamlet which is at few volts different from the first beamlet catch up with the slower electrons in the same beamlet, thereby forming a second electron bunch. Because of the voltage difference between the beamlet, the second bunch is spatially apart from the first bunch. As such, the voltage difference between beamlets may be adjusted so that each beamlet bunches with a timing increment which is the EUV wave oscillation period. Thus, the wavelength of the output radiation from the system 100 can be adjusted by adjusting the voltage difference between emitters 112.

Also, a bunch compressor 130 may be provided along the electron propagation pathway between the optical frequency modulator 120 and the undulator 140. The bunch compressor 130 reduces the path length for optimal bunching to occur, and thereby allows the bunched electron beam have high peak current density. The bunch compressor 130 may be described generally as an element that has high dispersion in the longitudinal phase-space. The bunch compressor is similar to a simple drift, but allows optimum bunching to occur in a much shorter distance of travel. Hence the beam comes to a longitudinal focus (bunching) sooner than if one just allows for drift. Therefore the lateral growth tends to be less and hence higher peak current density is usually attainable.

In one example, the bunch compressor 130 may be a magnetic chicane built from a set of bending magnets. In particular, a magnetic chicane may include four dipoles to produce magnetic fields effective to spatially disperse electrons in the bunched electron beam as a function of electron energy and focus the bunched electron beam. The electrons in the head of the modulated electron beam have a lower energy than those in the back. When the electrons travel through the curved trajectories of the chicane, the high energy electrons take a shorter path and catch up to the electrons in the head, and thereby compressing the bunched electron beam.

Figure 2E:
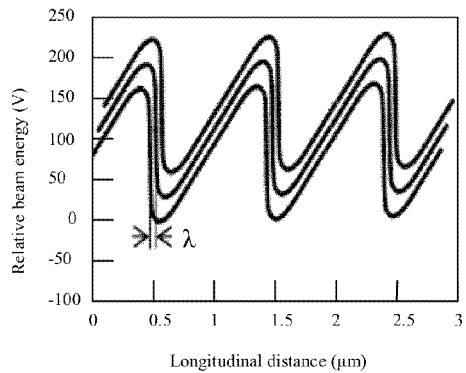
Figure 2F:
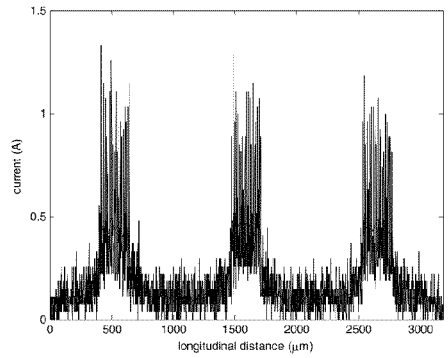

FIGS. 2E and 2F show the relative beam energy and currents of the illustrated compressed electron beam 138 after electrons bunching in drift spaces have been compressed by the bunch compressor 130. As seen in FIG. 2E, the electrons bunch at a spatial frequency corresponding to the wavelength of the infrared radiation. The bunching of electrons in the beam 138 constitutes an RF current as shown in FIG. 2F.

The compressed electron beam 138 enters an undulator 140 at the longitudinal focus of the beam array. In one example, the undulator 140 consists of an array of dipole magnets which produce a transverse, spatially periodic magnetic field. When the compressed electron beam 138 passes through, the magnetic field of the undulator 140 bends the beamlets back and forth in the traverse direction. Each time an electron in the beam 138 is deflected, it emits a broadband burst of synchrotron radiation. Due to the bunching of the electrons, the synchrotron radiation emitted by emitted by electrons can be made coherent. The wavelength of the resulting coherent radiation 141 depends partly on the energy of the electrons traversing the undulator 140 and partly on the spatial period of the undulator.

By way of example, and not by way of limitation, the undulator 140 may be a soft-magnet undulator that uses an actively powered coil producing magnetomotive force to generate magnetic flux. A magnetic yoke may be used to direct the flux across the undulator gap. In addition, engineered magnetic pole tips may be used to concentrate the magnetic flux density. Alternatively, besides an undulator there are other methods that a free electron beam can produce coherent radiation. Such methods include use of a transition radiation surface, refractive index medium for Cerenkov radiation, or even a photonic to convert the electron pulse structure to the equivalent photon pulse structure. In all these methods the surrounding medium or construct allows for an electromagnetic wave mode that co-propagates with a phase velocity equal to the velocity of the electrons. This allows for transfer of the electron kinetic energy to the co-propagating electromagnetic mode.

Additionally, the system 100 may include a high voltage generator 150 such as Van de Graaf generator to accelerate beams to a few MeV.

In the case where the beamlets 116 are produced by DC power, the beam energy from the undulator 140 may be recovered, e.g., by capturing the electron beam 138 with a Faraday cup floated at a voltage slightly lower than the voltage of the initial DC sources in the accelerator unit 110. As used herein, a voltage is slightly lower if it is close to the accelerating voltage, e.g., as applied by the Van de Graaf generator 150, but lower by an amount that accounts for energy losses in the electron beam 138, including losses resulting from generation of the coherent radiation 141. As such, instead of disposing the spent beam at full energy which may create radiation and heat, the energy of the beam may be reused.

Figure 3:
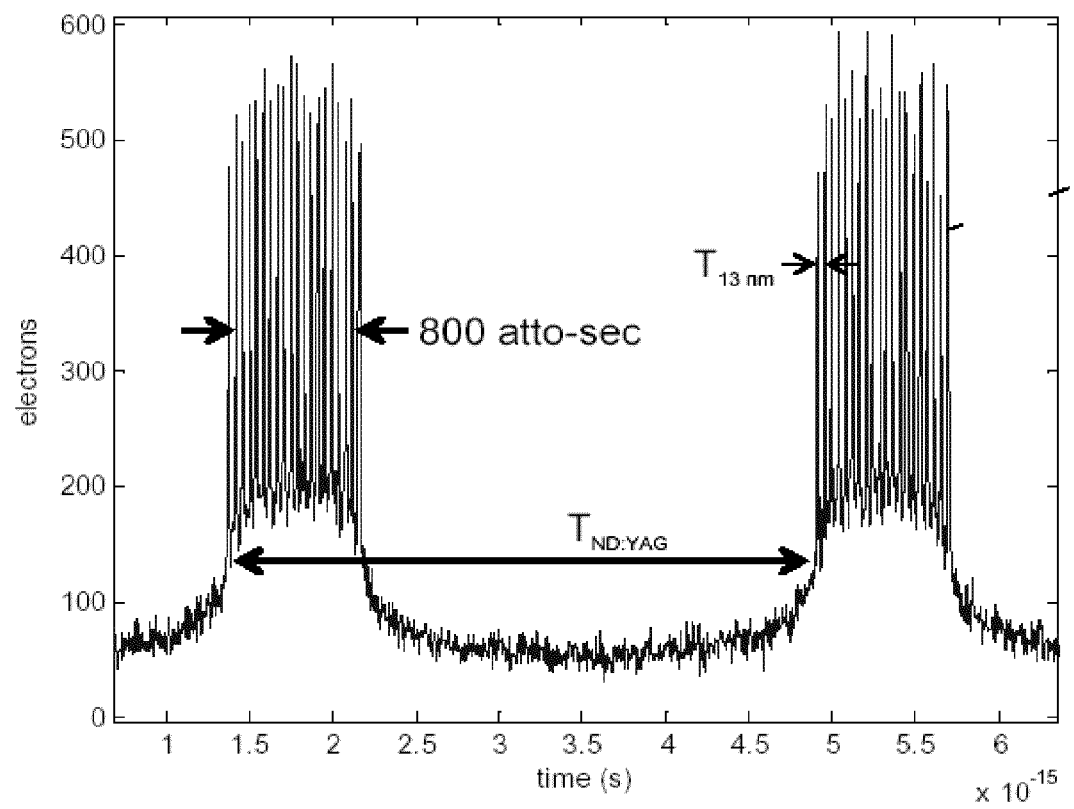
FIG. 3 shows illustrated EUV light pulses generated from a system according to an aspect of the present disclosure.

With a system according to the present disclosure, adjustments on the voltage difference between the beamlets 116, the system may generate coherent radiation at various wavelengths. In addition, the system may generate broadband radiation at a pulse period that can be adjusted by turning selectively turning the electron emitters 112 on or off. In other words, the pulse duty cycle can be controlled by the number of the emitters turned on. As shown in FIG. 3, the pulse train has a repetition rate equal to the wavelength of the infrared radiator. FIG. 3 also shows, with 20 beamlets, an EUV light pulse of about 800 attoseconds may be obtained. Each beamlet may have a current of 10 milliamperes (10 mA) for a total beam current of 200 mA. To lengthen the pulse, more emitters in the array may be turned on to produce more beamlets.

Aspects of the present disclosure provide for generation of coherent output radiation that is broadly tunable over a wide range of wavelengths. Using spatially separated electron beam emitters to produce beamlets at different energies, a free electron laser may use simple electrostatic acceleration. This allows for a simpler, less expensive and less complex source of EUV radiation.

Aspects of the present disclosure have a wide range of applications and are not limited to implementations involving radiation sources, such as free electron lasers. For example, the emitter array 112, half-chicane 114 and the modulator 120 may serve as an injector of a bunched particle beam for laser-driven particle accelerators. It is noted that in such implementations, the emitter array may include an array of charged particle emitters other than electron emitters. By way of example, and not by way of limitation, the emitter array 112 may be an array of ion beam emitters.

The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC §112, ¶ 6. In particular, the use of "step of" in the claims herein is not intended to invoke the provisions of 35 USC §112, ¶ 6.

What is claimed is:

1. A system, comprising:
a) an electrostatic accelerator unit including an array of spatially separated charged particle emitters, each emitter having an electrostatic potential difference with respect to an immediately adjacent emitter in the array and each emitter producing an charged particle beamlet, whereby the array of charged particle emitters produces a corresponding array of charged particle beamlets having different energies, wherein the charged particle beamlets are converged laterally as one energy-modulated direct current (DC) charged particle beam at an output of the accelerator unit; and
b) an optical-frequency modulator for longitudinally modulating the energy-modulated DC charged particle beam from the output of the accelerator unit with infrared radiation, thereby forming modulated beamlets, wherein electrons in the modulated beamlets are bunched longitudinally to form a bunched energy-modulated DC charged particle beam.

2. The system of claim 1, wherein the charged particle emitters are electron emitters, each charged particle beamlet is an electron beamlet, and the charged particle beam is an electron beam.

3. The system of claim 2, wherein the emitters are DC electron guns.

4. The system of claim 2, further comprising an undulator or other free-electron radiation device located at a point of optimum bunching of the modulated beamlets to generate a coherent radiation output from modulation of the bunched energy-modulated DC electron beam.

5. The system of claim 2, each of the electron beamlets is accelerated to about 100 KeV from the respective emitter in the array.

6. The system of claim 2, wherein the optical-frequency modulator is an inverse free electron laser.

7. The system of claim 1, wherein the array of charged particle emitters is placed at a mid-plane of a half-chicane to spatially overlap the array of charged particle beamlets at an exit of the half-chicane.

8. The system of claim 1, wherein the electric potential difference between the charged particle emitters in the array is adjustable.

9. The system of claim 1, wherein one or more of the charged particle emitters in the array are configured to be selectively switched on or off.

10. The system of claim 1 further comprising a bunch compressor placed along an electron propagation pathway between the optical frequency modulator and the undulator to shorten a travel distance of the charged particle beam downstream of the optical frequency modulator to bunch.

11. The system of claim 1, wherein the optical-frequency modulator includes a laser.

12. The system of claim 10, wherein the laser is a Nd:YAG laser.

13. The system of claim 1, further comprising a charged particle collector configured to collect an output electron beam from the system at a potential slightly below that of the potential used to accelerate the charged particle beamlets.

14. The system of claim 1, wherein the accelerator unit includes a half chicane having two bending magnets configured to bend the charged particle beamlets from the emitters in the array so as to laterally converge the charged particle beamlets to form the electron beam output from the accelerator unit.

15. A method of generating EUV radiation, comprising:
emitting an array of spatially separated beamlets, wherein each beamlet is produced by a corresponding array of electron emitters, wherein each electron emitter is at an electrostatic potential difference with respect to an immediately adjacent emitter in the array, whereby the array of electron emitters produces a corresponding array of electron beamlets having different energies;
converging the beamlets laterally to form an energy modulated direct current electron beam;
modulating the beamlets in the energy modulated direct current electron beam longitudinally with infrared radiation to form a modulated beam;

bunching electrons in the modulated beam longitudinally to formed a bunched energy-modulated electron beam; and modulating the bunched energy-modulated electron beam with an undulator to generate a coherent radiation output.

16. The method of claim 15 further comprising a step of compressing the bunched energy-modulated electron beam laterally to correct electron dispersion.

17. The method of claim 15, further comprising adjusting a wavelength of the coherent radiate output by adjusting the electrostatic potential difference between adjacent emitters in the array.

18. The method of claim 15, further comprising selectively switching one or more of the electron emitters on or off so as to adjust a pulse period of the coherent output radiation.

19. The method of claim 15, wherein the array of electron emitters is placed at a mid-plane of a half-chicane to spatially overlap the array of electron beamlets at an exit of the chicane thereby converging the beamlets laterally.

20. A method of generating a bunched particle beam, comprising:

emitting an array of spatially separated beamlets, wherein each beamlet is produced by a corresponding array of charged particle emitters, wherein each emitter is at an electrostatic potential difference with respect to an immediately adjacent emitter in the array, whereby the array of emitters produces a corresponding array of charged particle beamlets having different energies;

converging the beamlets laterally to form an energy modulated direct current charged particle beam;

modulating the beamlets in the energy modulated direct current charged particle beam longitudinally with infrared radiation to form a modulated beam; and bunching charged particles in the modulated beam longitudinally to formed a bunched energy-modulated charged particle beam.

* * * * *